April 22, 1958     S. C. LOMBARDO     2,831,217
OUTDOOR SPORTS ARENA AND MOTION PICTURE SYSTEM
Filed Jan. 6, 1955     3 Sheets-Sheet 1

INVENTOR.
SAMUEL C. LOMBARDO,
BY
Justin W. Macklin
ATTY

INVENTOR.
SAMUEL C. LOMBARDO,
BY Justin C. Macklin
ATTY

United States Patent Office 2,831,217
Patented Apr. 22, 1958

2,831,217

OUTDOOR SPORTS ARENA AND MOTION PICTURE SYSTEM

Samuel C. Lombardo, Independence, Ohio

Application January 6, 1955, Serial No. 480,231

5 Claims. (Cl. 20—1.12)

This invention relates to a combination outdoor drive-in theater and an outdoor arena associated therewith within the area of the theater and its screen. The arena is so arranged that it may be used during daylight (or evening) hours for sports events such as wrestling, prize fighting, and tennis matches without interfering with the projection of motion pictures onto the screen after the usual manner of automobile drive-in motion picture arrangements, which are well known.

However, certain modifications permit attaining the following conveniences and economies. Parallel driveways may be arranged for automobiles with audience customers to pay for two performances or by selection and coming at different times to pay for an evening performance, which may be the motion picture only or a musical show or outdoor vaudeville performed on the stage or ring-like platform in view of specially arranged arena seats. The arrangement of the arena seats and of the parking ramps for viewing the screen and the location of the projector with relation to the seating arrangements all are such that the arena events of wrestling, prize fighting, shows, or any performance such as mentioned, will in no way interfere with a subsequent immediate showing of motion pictures in the usual fashion.

It is recognized that there have been some attempts to utilize the space between the nearest automobile parking and viewing ramp and the screen, such as providing children's swings, sand boxes and the like. However, this invention for the first time has provided for seating thousands of people in satisfactory viewing position beneath the level of the screen and surrounding a performance area, which may be in the nature of a standard ring for wrestling or boxing, a tennis court or surface or platform for comparable exhibitions. For example, a platform suitable for musical performances, theater or vaudeville comparable to the so-called "theater-in-the-round" may be so located. As shown in the drawings hereof, the seats are preferably arranged in parallel rows on the sides of a rectangle, it being necessary, however, to make special provision for the seats on the side toward the automobile parking ramps and the projector being of such a height and arrangement as not to interfere with projection and viewing.

The seats are preferably terraced bench seats, which may be removable or permanent, of the concrete or stadium bench type around the arena performance area.

Such a combination drive-in motion picture parking and screen arrangement may be large enough to park 1,000 or more cars for screen viewing. Several thousands of cars may be parked in the same area if arranged end to end in circular rows along the zones of the usual viewing ramps, in which case the passengers leave the cars so parked and walk to the arena seats usually, but not necessarily, to see a daytime performance. As soon as the arena performance is over, the picture may be shown on the screen, and as the cars carrying the passengers who have viewed the arena performance leave the area, picture viewing customers may park their cars headed toward the screen in the usual up-sloped position.

The invention contemplates further convenient and profitable utilization of the area in the provision of available refreshment stands and restrooms.

My invention also contemplates providing the speakers or sound reproducers for attachment to the inside of the car and the adjacent stands for carrying the same when not in use. These stands may also be equipped with electric heaters which may similarly be placed in the car, thus providing for extending the season of outdoor shows into colder weather withoiut the danger of exhaust fumes resulting from viewers running their motors to keep warm.

Other implementations of my combined sports arena and motion picture theater include the provision for utilizing the structure of the large picture screen and of a limited area at the back of the screen for dressing rooms for performers, with suitable entrances to the performance area.

The combined arena and parking area is surrounded by a suitable driveway, along the entrance side of which are located the ticket gates, preferably adjacent the arena, while an easy vehicle flow exit drive is so arranged as to best utilize the entire available area with a minimum of unused space. This is particularly desirable where it is necessary that such a combined arena and drive-in motion picture theater shall justify its expense when located on land of high value, as in relatively congested areas of population.

Another advantage is that my compact arrangement requires but a minimum amount of enclosure fence or wall surrounding the area, and also a minimum amount of screen or wall shielding the lights of incoming vehicles.

Other advantages and details of the arrangement will become more apparent in connection with the following description which relates to the accompanying drawings, in which.

Figure 1:
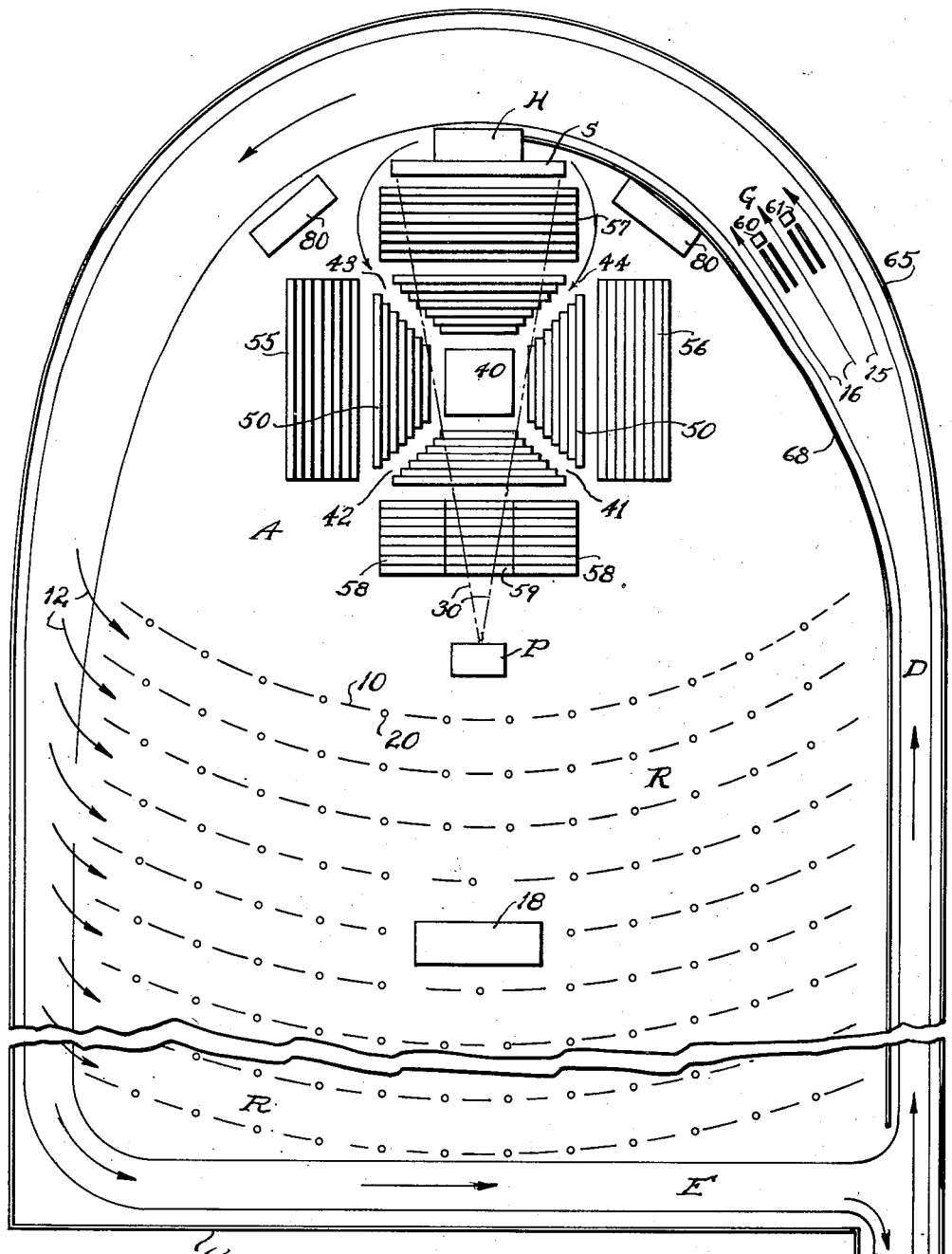
Fig. 1 is a plan view showing the outdoor theater, the arena and other constituent parts including the picture screen, dressing rooms, refreshment stands, etc., and the driveway surrounding the parking area.

Referring to the drawings, describing the combined arena and outdoor motion picture theater by the use of reference characters, at the upper portion of Fig. 1 appears the screen S. The projector booth appearing near the middle of the figure is designated P. An incoming driveway is indicated at D, which continues to encircle the field and from which the cars may pass into the picture viewing ramps, generally indicated at R, and continue to an exit, as indicated at E.

Behind the picture screen is indicated the dressing room house structure H, which may be one or two stories in height, as desired, it being important only not to encroach upon the driveway passing behind the screen.

Referring to the parts more in detail and by the use of reference numerals, the arena area is shown as a flat surface, although it may slope slightly with relation to the central portion of the area if desired. The curved ramps are indicated by lines 10, and the small circles 20 indicate the posts or stands for the sound instruments.

Arrows 12 indicate the incoming paths of the automobiles after entering the receiving gate along the drive D and passing through the ticket gates, as indicated by arrows at 15 and 16, for different performances and the purchase of different kinds of tickets. The broken lines 30 in Fig. 1 indicate the light beam from the projector in the booth P to the screen S. At 18 is indicated a refreshment stand, restroom, and shelter structure.

In Fig. 1 a square ring in the arena is indicated at 40 with pathways between the seating arrangements at 41, 42, 43, and 44. This rectangle 40, there shown, indicates a wrestling or boxing ring of standard proportions and it is surrounded by reserve seats, which may be removable chairs or suitable seats with backs arranged in rows, indicated diagrammatically at 50. These are on the ground level with the observers' eyes preferably substantially even with the ring or slightly above or below, as may be desired.

Figure 2:
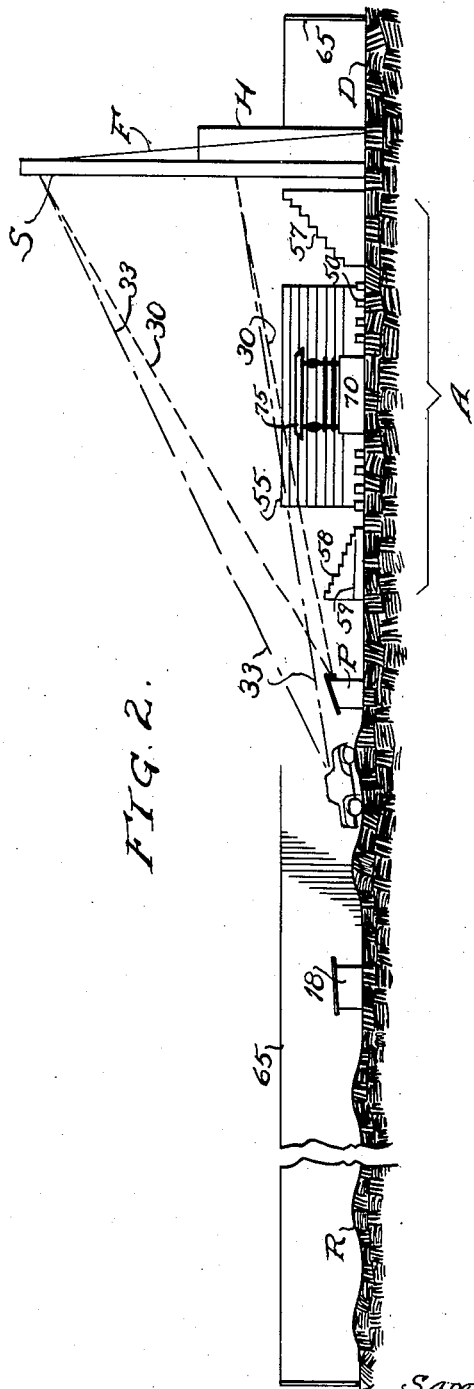
Fig. 2 is a longitudinal, diagrammatic view taken on a vertical plane substantially through the central portion of the arena, picture screen and automobile viewing ramps.

Terraced upwardly from pathways or aisles between these and the lower seats of terraces are seats 55 and 56 parallel with two sides, while beneath the screen and parallel with it are terraced seats 57, and terraces of lesser slope 58 are arranged at either side of a lower and substantially level section 59, which may have a center aisle. This section 59 is made lower than the adjacent section so that persons on it, even if standing, cannot come into the line of the lower portion of the light beam passing to the picture screen. The lower and upper lines of light are indicated at 30 in Fig. 2 also. The lines 33 illustrate the viewers' vision of the screen.

The driveway D is shown as widening and may divide into three or more single car passageways between ticket booths indicated at 60 and 61, which may be for selling the same or different values of tickets.

A protective fence, as indicated at 65, extending around the outside of the entire driveway and a transverse portion 66 may extend along the exit passageway, thus enclosing the area, while a screen protecting from driving lights as well as preventing viewing before passing the ticket stations, as indicated at 16, may be provided. Variations may be made in that arrangement.

The innermost arc of the viewing ramp, as usual, extends behind the projecting booth P, and the distance from this ramp to the screen is, of course, more or less limited to a comfortable and practicable viewing distance, which may be referred to as the usual established minimum viewing distance. Thus, a large number of viewing ramps, for example, one to two thousand cars, may be arranged in the theater area, providing the screen is large enough and the projection is of sufficient light power.

In Fig. 1 a much larger number of ramps than indicated may be used; hence, the figure is shown as broken transversely, it being understood that it may extend away from the screen to the farthest satisfactory viewing distance, depending upon the geographical limitations and surroundings.

The area within the innermost ramp which must be at a considerable distance from the large elevated screen is usually of no paying value. The present invention, however, makes profitable and unique use of it.

Figure 3:
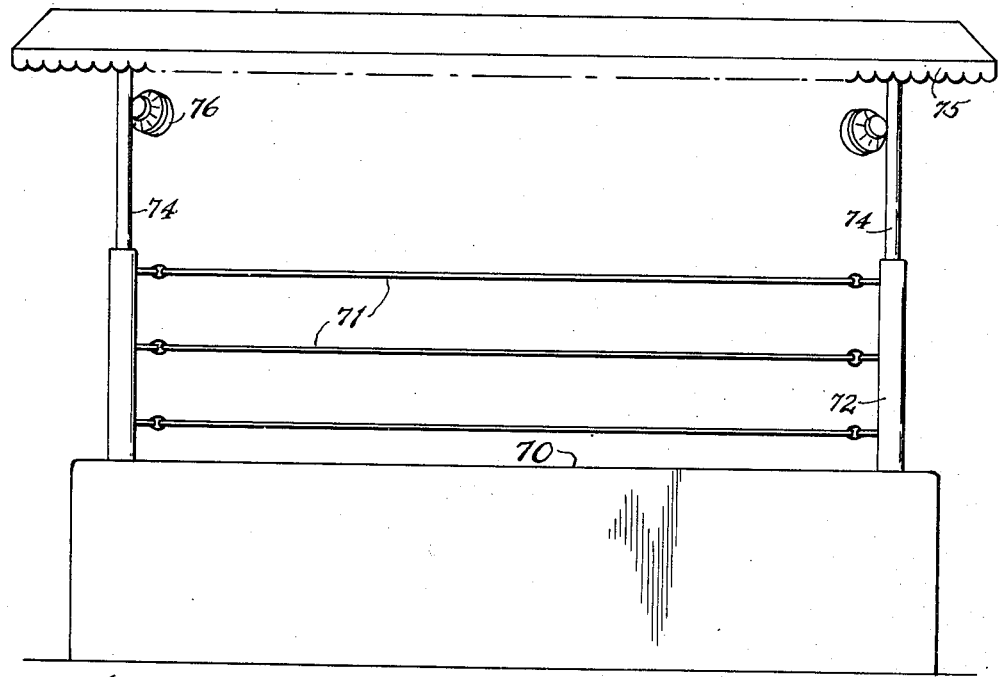
Fig. 3 is a side elevation of a wrestling or boxing ring.

Shown in Fig. 3 is the usual standard boxing or wrestling ring with its flat platform 70, its ropes 71 and corner posts 72. Because of the summer performances and frequent sun heat, particularly when reflected from a screen area which may be 60 or 70 feet high, it has been found desirable to shade the performers while not interfering with the spectators' view. Accordingly, arising from the corner posts and thus in line with the pathways affording least interference with seated viewers, I have shown extensions 74 supporting a suitable shade or canopy 75.

As further aid to the performers, fans 76 may be mounted on the posts in positions where they do not interfere with viewing the performers in the ring.

By rearranging the seats, the horizontal or level surface area may be enlarged sufficiently for viewing a tennis match. A seating arrangement which is now actually in use is substantially that indicated and described, and is in front of a screen about 70 feet wide, from which it will be seen that a full-sized tennis court may be placed between the seat sections 55 and 56, and without disturbing the terraced seats 57 and 58 and at the same time attaining the important objective of not interfering with the projection to the screen for after-dark picture showing.

The walk-ways provide for convenient access of the performers around the end of the screen, as indicated by arrows, and likewise, the customers may patronize refreshment stands indicated at 80 and 81.

Larger platforms than a boxing or wrestling ring may be used, as for musical or like performances by large groups. Circular platforms may be used for theatrical or vaudeville performances, which may be suitably illuminated to be performed after dark, instead of the motion picture.

Figure 4:
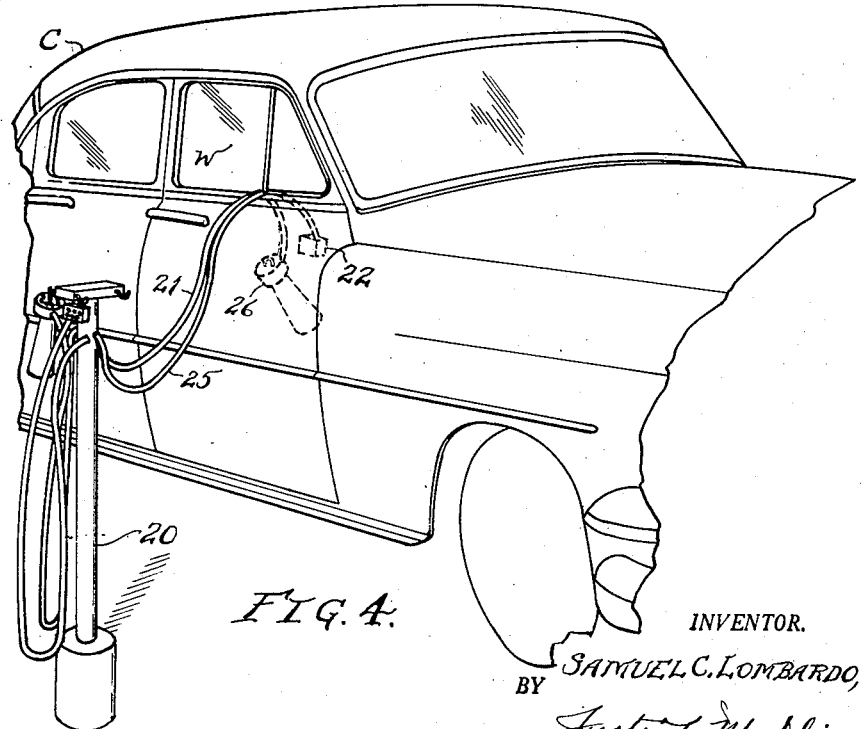
Fig. 4 illustrates the sound and heating equipment in an automobile in picture-viewing position.

In the combined arrangement, I have provided the usual sound reproducers adapted to be placed within the car, and the stands 20 for that purpose are positioned to service two cars parked between adjacent stands, while cords 21 for the sound boxes 22 pass through the window W of the viewer's car C, as shown in Fig. 4.

Electrical current may be supplied to these stands 20, and through cords 25, may supply current to a heater and fan combination, indicated in broken lines at 26, for warming the interior of the car, thus avoiding the danger resulting from viewers running their motors to heat the cars.

Having thus described my invention, what I claim is:

1. A combined outdoor motion picture theater and arena comprising a screen, picture projector and curved automobile parking ramps for picture viewers remote from the screen, the nearest of which ramps is at the usual established minimum viewing distance, a driveway and an enclosure surrounding and containing the screen and ramps and projector and provided with entrance and exit passages, the driveway curving behind the viewing screen and leaving an area between the driveway and said nearest parking ramp, a performers' platform located approximately at the middle of said area, and viewers' ringside seats arranged around said platform and on a surface extending to and below that of the platform and arranged with aisles radiating therefrom, tiers of seats arranged around the ringside seats and rising upwardly therefrom, the tier adjacent the screen having seats below but adjacent to the bottom of the screen, and the adjacent tiers of seats rising to corresponding height and a lower group of seats between the platform and the projection booth.

2. The combination arena and outdoor motion picture arrangement described in claim 1, in which the entrance driveway has a widened portion and is provided with a plurality of ticket booths and adjacent divided lanes.

3. An outdoor motion picture theater and arena including the viewing screen and picture projection booth at a distance therefrom suitable for projecting a picture onto the entire area of the screen, curved parallel automobile parking ramps on which at least a thousand cars may be sloped upwardly for picture viewing, the nearest ramp curving behind the projection booth with relation to the screen, the driveway being arranged in a curved path behind the screen, an enclosure around the area, and an arena comprising a performers' stage between the projection booth and the screen, rows of seats on substantially level surface adjacent to the stage with radiating aisles surrounding the level seats and tiers of seats rising upwardly from beyond the aisles and arranged below the picture projection light beam.

4. The arrangement described in claim 3 in which the performers' stage is surrounded with parallel rows of seats on a level and terraced seats arising from aisles outside said seats on three sides of the stage, while a fourth side toward the projection booth has a middle portion of low level seats below the path of the picture projection beam.

5. A combination outdoor drive-in motion picture theater and outdoor sports arena, the drive-in theater comprising a large elevated viewing screen and picture projection booth and parallel parking ramps on which automobiles may be sloped upwardly and forwardly for picture viewing, and the arena comprising an adjacent substantially level area having a performers' stage located between the screen and ramps, rows of ringside seats adjacent to the stage arranged to provide radiating isles, rising tiers of seats arranged around the ringside seats positioned to form isles providing access to the tiers of seats, said areas being so communicating as to facilitate walking from the parking and viewing area to the arena seats, an enclosure surrounding both of said areas and having entrance gateway restricted passageways and adjacent ticket booths providing for single ticket entrance giving access to both arena and viewing areas whereby patrons may park in picture viewing position and have convenient and unrestricted access to the arena seats, and an exit driveway leading from the ramps.

References Cited in the file of this patent

UNITED STATES PATENTS

| | | |
|---|---|---|
| 1,433,547 | Hadden | Oct. 31, 1922 |
| 1,444,360 | Randall | Feb. 6, 1923 |
| 1,957,947 | Dreyfuss | May 8, 1934 |
| 2,052,217 | De Sibour et al. | Aug. 25, 1936 |
| 2,102,718 | Josserand | Dec. 21, 1937 |
| 2,146,103 | Williamson | Feb. 7, 1939 |
| 2,638,636 | Pool | May 19, 1952 |

OTHER REFERENCES

Affidavit by Sutherland March 22, 1950.